United States Patent [19]
Johansson et al.

[11] Patent Number: 5,539,793
[45] Date of Patent: Jul. 23, 1996

[54] LOWER TIE PLATE DEBRIS CATCHER FOR A NUCLEAR REACTOR

[75] Inventors: Eric B. Johansson, Wrightsville Beach, N.C.; Bruce Matzner, San Jose, Calif.

[73] Assignee: General Electric Company, Schenectady, N.Y.

[21] Appl. No.: 330,858

[22] Filed: Oct. 27, 1994

[51] Int. Cl.⁶ .............................. G21C 3/30; G21C 15/00
[52] U.S. Cl. ........................... 376/443; 376/352; 376/313
[58] Field of Search .................................. 376/352, 313, 376/446, 443

[56] References Cited

U.S. PATENT DOCUMENTS

| | | |
|---|---|---|
| 1,240,081 | 9/1917 | Moss . |
| 1,504,233 | 8/1924 | Graham . |
| 1,992,472 | 2/1935 | Craig . |
| 3,414,474 | 12/1968 | Swanson . |
| 3,528,885 | 9/1970 | Kumpf . |
| 3,725,199 | 4/1973 | Notari et al. . |
| 3,801,453 | 4/1974 | Jones . |
| 3,840,051 | 10/1974 | Akashi et al. . |
| 3,878,870 | 4/1975 | Atherton et al. . |
| 3,879,259 | 4/1975 | Persson et al. . |
| 3,945,883 | 3/1976 | Hind et al. . |
| 3,971,698 | 7/1976 | Wolff et al. . |
| 4,032,398 | 6/1977 | Cross et al. . |
| 4,036,690 | 7/1977 | Betts et al. . |
| 4,053,358 | 10/1977 | Pennell . |
| 4,053,359 | 10/1977 | Pennell et al. . |
| 4,076,586 | 2/1978 | Bideau et al. . |
| 4,096,032 | 6/1978 | Mayers et al. . |
| 4,116,764 | 9/1978 | Jones . |
| 4,198,272 | 4/1980 | Salmon . |
| 4,412,969 | 11/1983 | Tilbrook et al. . |
| 4,420,457 | 12/1983 | Le Pargneux . |
| 4,427,624 | 1/1984 | Marlatt et al. . |
| 4,446,099 | 5/1984 | Schwind et al. . |
| 4,505,877 | 3/1985 | Rion . |
| 4,610,838 | 9/1986 | Gasparro et al. . |
| 4,614,636 | 9/1986 | Walters . |
| 4,615,862 | 10/1986 | Huckstein . |
| 4,636,525 | 1/1987 | Yant . |
| 4,652,425 | 3/1987 | Ferrari et al. . |
| 4,655,995 | 4/1987 | Freeman et al. . |
| 4,664,880 | 5/1987 | Bryan . |
| 4,678,627 | 7/1987 | Rylatt . |

(List continued on next page.)

FOREIGN PATENT DOCUMENTS

| | | |
|---|---|---|
| 90104066.5 | 2/1990 | China . |
| 0196611 | 8/1986 | European Pat. Off. . |
| 0289829 | 9/1988 | European Pat. Off. . |
| 0311037 | 12/1989 | European Pat. Off. . |
| 0435744A1 | 3/1991 | European Pat. Off. . |
| 0432738A1 | 6/1991 | European Pat. Off. . |
| 0455011A1 | 11/1991 | European Pat. Off. . |
| 0432739A1 | 12/1991 | European Pat. Off. . |
| 0466553A1 | 1/1992 | European Pat. Off. . |
| 4006264A1 | 8/1991 | Germany . |
| 54-19080 | 2/1979 | Japan . |
| 54-102493 | 8/1979 | Japan . |
| 54-141989 | 11/1979 | Japan . |
| 57-102215 | 6/1982 | Japan . |
| 60-162985 | 8/1985 | Japan . |
| 62-96891 | 5/1987 | Japan . |
| 63-61183 | 3/1988 | Japan . |
| 63-157093 | 6/1988 | Japan . |

*Primary Examiner*—Harvey E. Behrend
*Attorney, Agent, or Firm*—Nixon & Vanderhye

[57] ABSTRACT

The lower tie plate grid includes cylindrical bosses and webs interconnecting the bosses for supporting nuclear fuel rods and defining flow channels through the grid for flowing coolant upwardly about the fuel rods. The grid includes shaped body members having flow openings, the members being disposed in each of the flow channels. In one form, the members define with the side walls of the bosses and webs a debris retention zone. In another form, sets of generally parallel, laterally spaced bars are disposed at discrete elevations in the flow channels. The bars are orthogonally related to one another whereby the effective debris catching area is defined by the openings through the crossed bars in plan, while the coolant flow area comprises essentially the space between each set of bars.

8 Claims, 9 Drawing Sheets

U.S. PATENT DOCUMENTS

| | | |
|---|---|---|
| 4,684,495 | 8/1987 | Wilson et al. . |
| 4,684,496 | 8/1987 | Wilson et al. . |
| 4,716,012 | 12/1987 | Gasparro et al. . |
| 4,772,447 | 9/1988 | Manson et al. . |
| 4,781,884 | 11/1988 | Anthony . |
| 4,826,653 | 5/1989 | Nylund et al. . |
| 4,828,791 | 5/1989 | DeMario . |
| 4,832,905 | 5/1989 | Bryan et al. . |
| 4,849,161 | 7/1989 | Brown et al. . |
| 4,900,507 | 2/1990 | Shallenberger et al. . |
| 4,919,883 | 4/1990 | Bryan . |
| 4,980,121 | 12/1990 | Roberts et al. . |
| 5,009,839 | 4/1991 | King . |
| 5,024,806 | 6/1991 | Cioffi et al. . |
| 5,024,807 | 6/1991 | Hatfield et al. . |
| 5,030,412 | 7/1991 | Yates et al. . |
| 5,037,605 | 8/1991 | Riordan, III . |
| 5,066,453 | 11/1991 | Heppenstall et al. . |
| 5,071,617 | 12/1991 | Bryan et al. . |
| 5,094,802 | 3/1992 | Riordan, III . |
| 5,100,611 | 3/1992 | Nylund . |
| 5,106,575 | 4/1992 | Nakamura et al. . |
| 5,128,096 | 7/1992 | Grattier . |
| 5,135,710 | 8/1992 | Grattier et al. . |
| 5,160,697 | 11/1992 | Verdier et al. . |
| 5,180,545 | 1/1993 | Grattier . |
| 5,219,517 | 6/1993 | Nylund . |
| 5,230,861 | 7/1993 | Nylund . |
| 5,282,231 | 1/1994 | Adams et al. . |
| 5,283,812 | 2/1994 | Verdier ................................ 376/352 |
| 5,345,483 | 9/1994 | Johansson . |
| 5,361,287 | 11/1994 | Williamson ........................ 376/352 |
| 5,365,558 | 11/1994 | Lippert et al. ..................... 376/445 |
| 5,384,814 | 1/1995 | Matzner et al. ................... 376/352 |
| 5,390,219 | 2/1995 | Poussin et al. .................... 376/313 |
| 5,390,220 | 2/1995 | Zuloaga, Jr. et al. ............. 376/313 |
| 5,390,221 | 2/1995 | Dix et al. ............................ 376/352 |

FOREIGN PATENT DOCUMENTS

| | | |
|---|---|---|
| 64-39593 | 2/1989 | Japan . |
| 64-83189 | 3/1989 | Japan . |
| 3-111795 | 5/1991 | Japan . |
| 3-274491 | 12/1991 | Japan . |
| 465644 | 10/1991 | Sweden . |
| 1214998 | 12/1970 | United Kingdom . |

Fig. 4
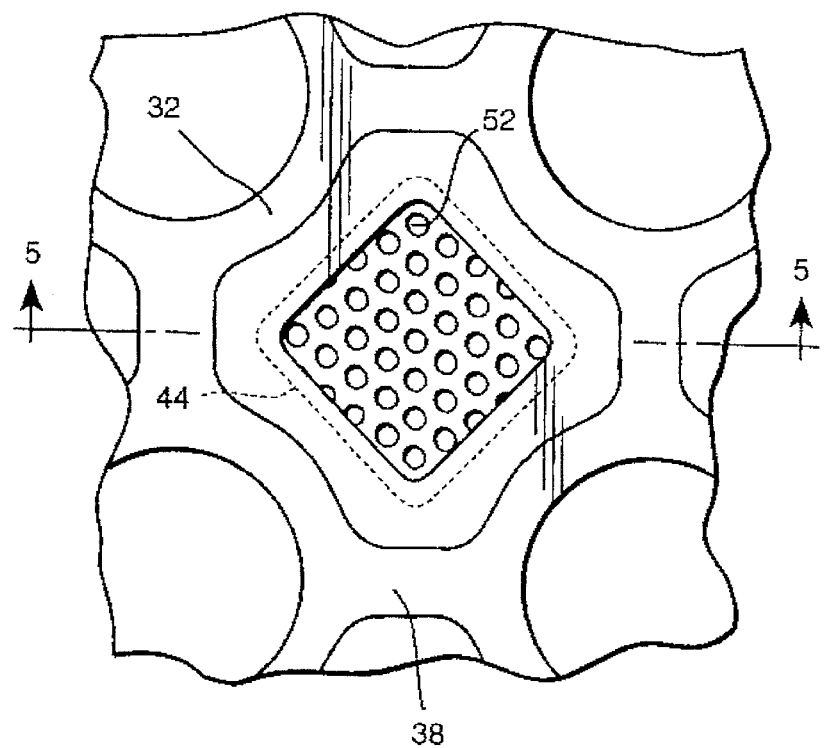
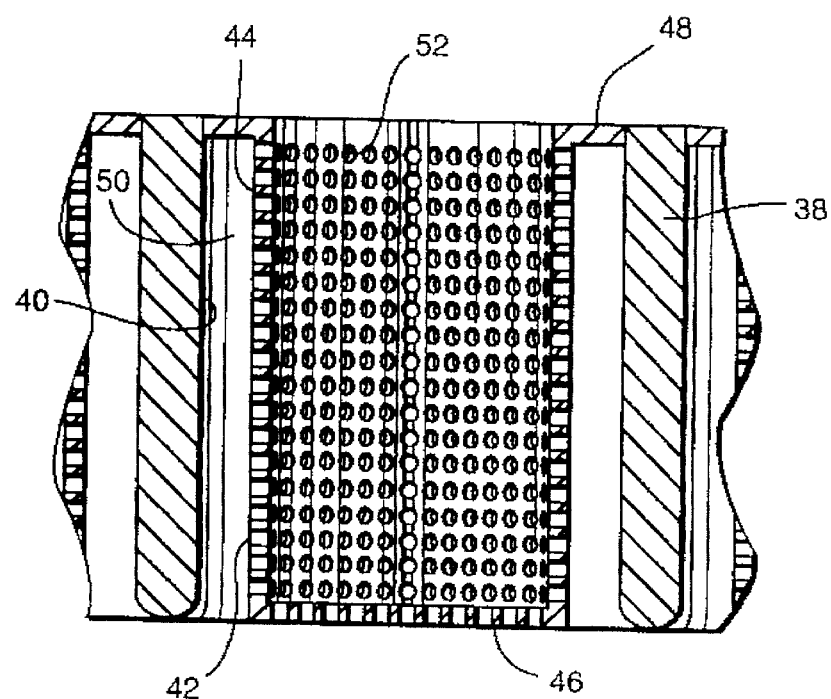
Fig. 5

Fig. 6
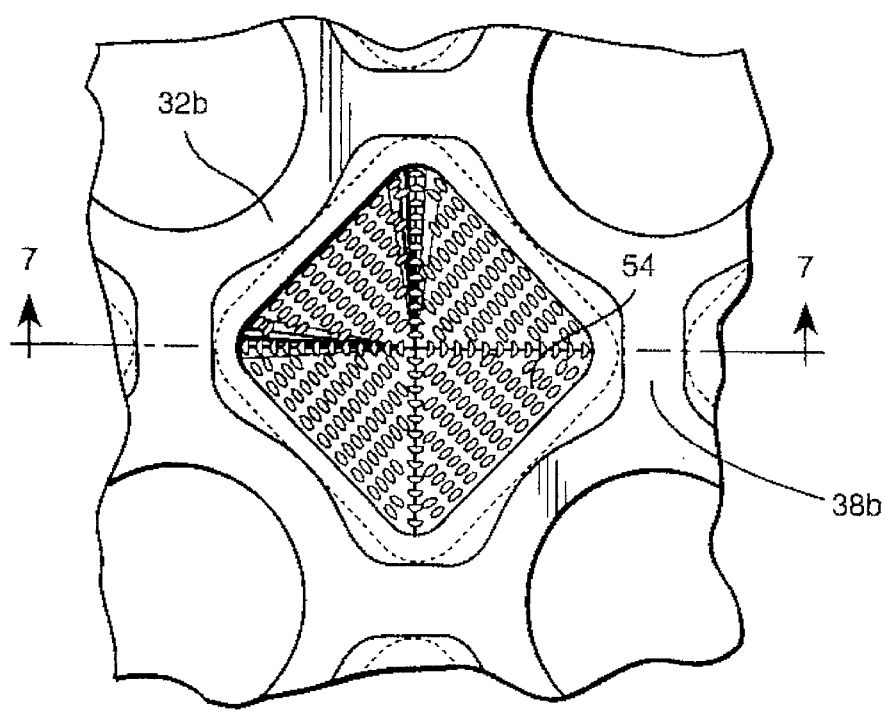
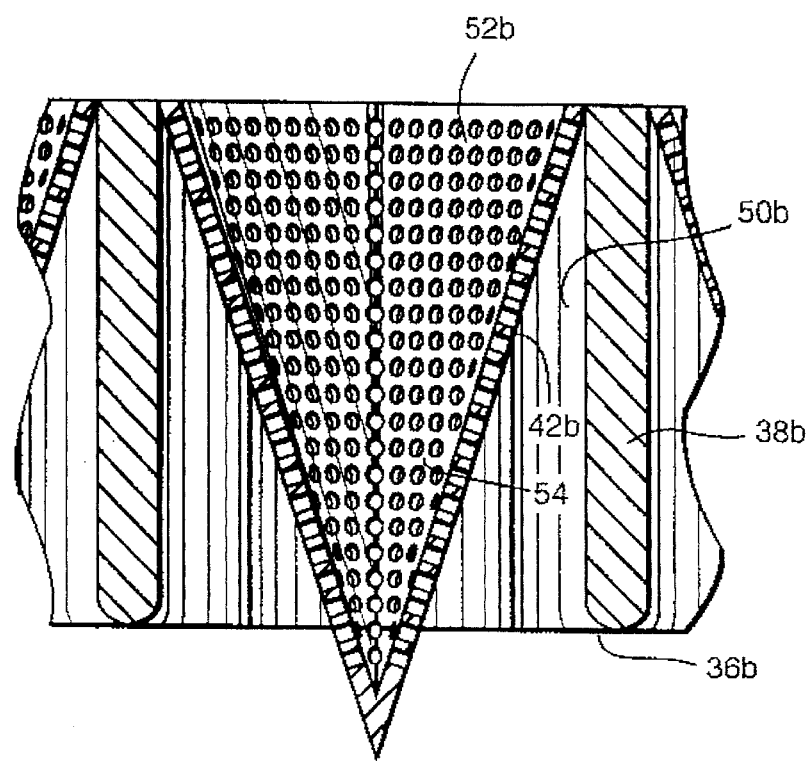
Fig. 7

Fig. 8
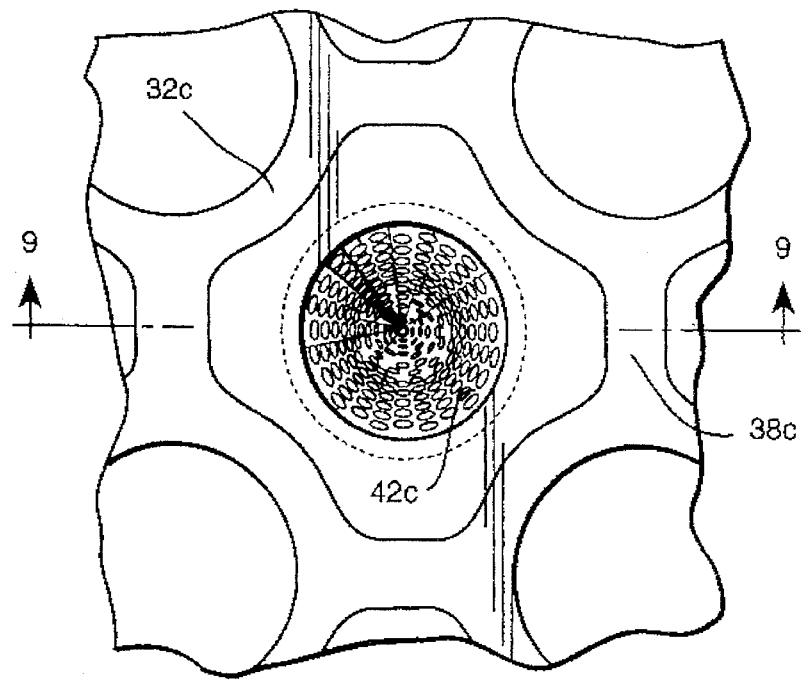
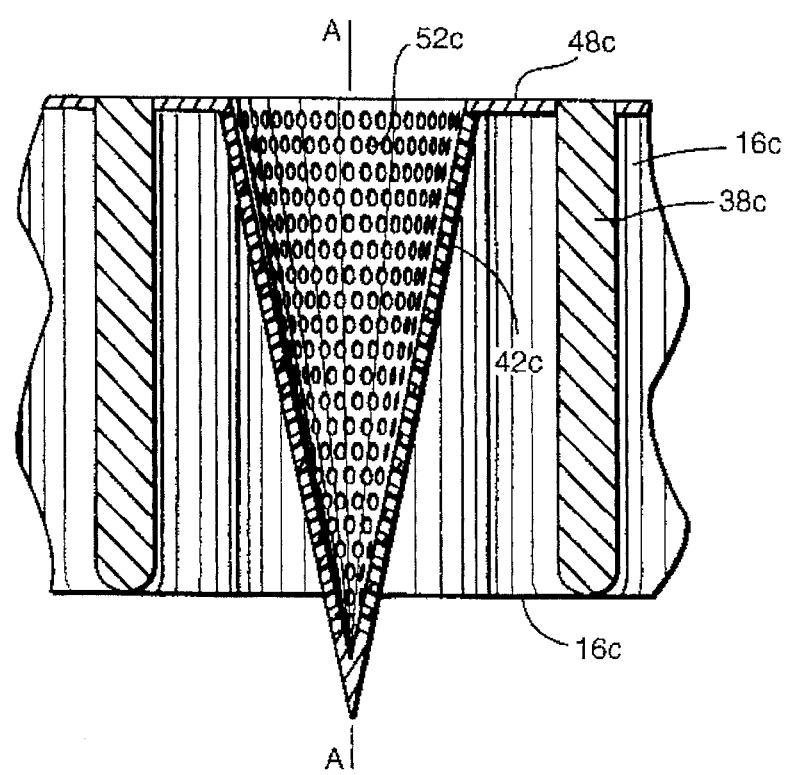
Fig. 9

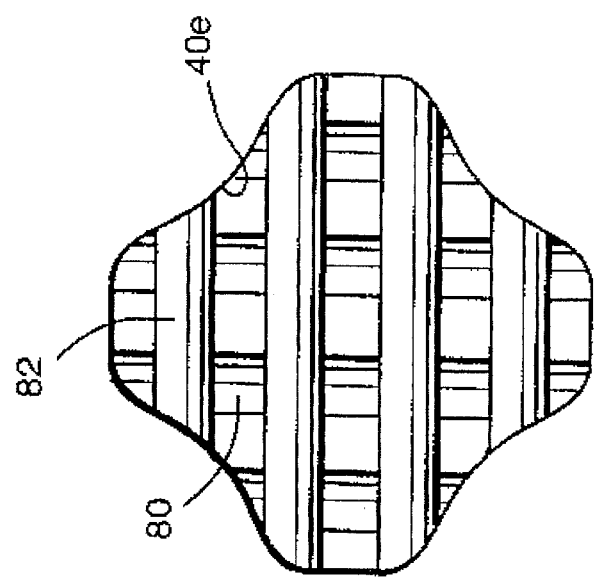
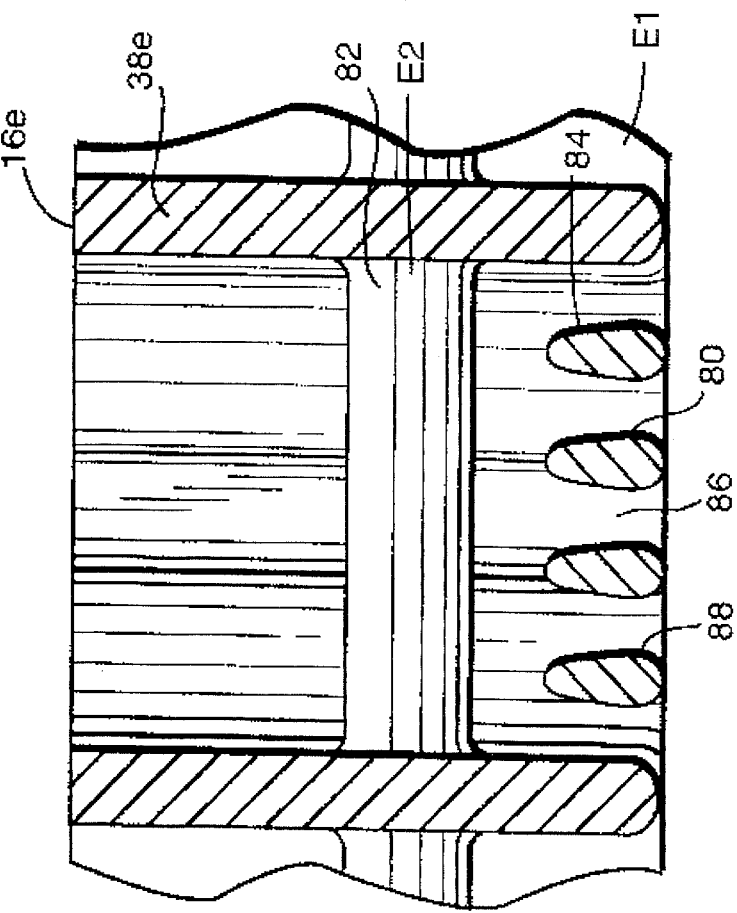

LOWER TIE PLATE DEBRIS CATCHER FOR A NUCLEAR REACTOR

TECHNICAL FIELD

The present invention relates to a lower tie plate grid for a nuclear reactor fuel bundle and particularly relates to a lower tie plate grid forming part of a lower tie plate assembly having a debris catcher for separating debris from the flow of water coolant through the lower tie plate grid.

BACKGROUND

Boiling water nuclear reactors have been in operation for many years. Commencing with their initial construction and throughout their service lives, these reactors may accumulate debris in their closed circulation moderator systems. This debris can become an operating hazard if the debris is allowed to enter into the fuel bundle core region containing the heat generating fuel rods. In order to understand this problem, a summary of reactor construction as it relates to the accumulation of debris in the core needs first to be given. Thereafter, fuel bundle construction will be set forth. Emphasis will be given to the need to preserve substantially unchanged the regions of pressure drop within the fuel bundles. Thereafter, the effects caused by debris entering into the fuel rod region of the fuel bundles will be summarized.

In boiling water nuclear reactor construction, the reactor is provided with a large, central core. Liquid water coolant/moderator flow enters the core from the bottom and exits the core as a water steam mixture from the top. The core includes many side-by-side fuel bundles, each containing a plurality of fuel rods. Water is introduced into each fuel bundle through a fuel bundle support casting from a high pressure plenum situated below the core. Water passes in a distributed flow through the individual fuel bundles and about the fuel rods, is heated to generate steam, and exits the upper portion of the core as a two-phase water steam mixture from which the steam is extracted for the generation of energy.

The core support castings and fuel bundles are a source of pressure loss in the circulation of water through the core. By properly controlling such pressure losses substantially even distribution of flow across the individual fuel bundles of the reactor core is achieved. When it is remembered that there are as many as 750 individual fuel bundles in a reactor core, it can be appreciated that assurance of the uniformity of flow distribution is important. To interfere with the pressure drop within the fuel bundles could affect the overall distribution of coolant/moderator within the fuel bundles of the reactor core.

The fuel bundles for a boiling water nuclear reactor include a fuel rod supporting lower tie plate assembly. Typically, this is a one-piece cast structure including an upper grid, a lower inlet nozzle and a structure providing a transition region from the inlet to the grid. The inlet nozzle provides for coolant entry to an enlarged flow volume within the flow transition region of the lower tie plate assembly. At the upper end of the flow volume, there is located a tie plate grid defining with the nozzle a flow volume. The tie plate grid has two purposes. First, it provides the mechanical support connection for the weight of the individual fuel rods to be transmitted through the entire lower tie plate assembly to the fuel support casting. Secondly, the tie plate grid provides a path for liquid water moderator to flow into the fuel bundle for passage between the side-by-side supported fuel rods.

Above the lower tie plate grid, each fuel bundle includes a matrix of upstanding fuel rods—sealed tubes each containing fissionable material which when undergoing nuclear reaction transfers energy to the flowing water to produce the power generating steam. The matrix of upstanding fuel rods includes at its upper end an upper tie plate assembly. This upper tie plate assembly holds at least some of the fuel rods in vertical side-by-side alignment. Some of the fuel rods are attached to both the upper and lower tie plate assemblies. Usually, water rods are also included between the upper and lower tie plate assemblies for improvement of the water moderator to fuel ratio, particularly in the upper region of the fuel bundle.

Fuel bundles also include a number of fuel rod spacers at varying elevations along the length of the fuel bundle. These spacers are required because the fuel rods are long (about 160 inches) and slender (about 0.4 to 0.5 inches in diameter), and would come into abrading contact under the dynamics of fluid flow and nuclear power generation within the fuel bundles. The spacers provide appropriate lateral restraints for each fuel rod at their respective elevations and thus prevent abrading contact between the fuel rods and maintain the fuel rods at uniform spacing relative to one another along the length of the fuel bundle for optimum performance. It will be appreciated that these spacers are sites where debris can be trapped and damage the fuel rods.

Each fuel bundle is surrounded by a channel. This channel causes water flowing between the upper and lower tie plate assemblies to be restricted to only one bundle in an isolated flow path between the tie plate assemblies. The channel also serves to separate the steam generating flow path through the fuel bundles from the surrounding core bypass region, this region being utilized for the penetration of the control rods. The water in the bypass region also provides neutron moderation.

In the operation of a boiling water nuclear reactor, maintenance of the originally designed flow distribution is very important. Specifically, from the lower (high pressure) plenum inlet to the core to the outlet from the core of the steam and water mixture through the upper tie plate assemblies of the fuel bundles, about 20 pounds per square inch (psi) of the pressure drop is encountered at typical flow operating conditions. About 7 to 8 psi of this pressure drop occurs through the fuel support casting. This pressure drop is mainly to assure the uniform distribution of coolant/moderator flow through the many fuel bundles making up the core of the reactor and is related to the prevention of operating instabilities within the reactor at certain power rates. At the lower tie plate assembly of each fuel bundle, from the inlet nozzle into the flow volume and through the tie plate grid, about 1 to 1½ psi pressure drop occurs which contributes to establishing flow distribution between the individual fuel rods of each fuel bundle. Finally, through the fuel bundle itself—from the exit of the lower tie plate assembly to the exit at the upper tie plate assembly—about 11 psi of pressure drop usually occurs. When new fuel bundles are introduced into a reactor core, these pressure drops must be preserved. Otherwise, the coolant/moderator flow distribution could be compromised.

With respect to the tie plate grid of the lower tie plate assembly, a matrix of cylindrical bosses and webs typically form the grid. The bosses are sized to receive the fuel rod end plugs. The bosses and webs also form a plurality of generally vertically extending channels for flowing coolant upwards from the flow transition region of the lower tie plate assembly through the grid and into the fuel bundle. The spacing and thickness of the bosses and webs are primary factors in controlling pressure drop resulting from water flow through the grid.

In early grid constructions, since the fuel rods had greater cross-sectional diameters, the bosses were large. In more recent grid constructions, since the fuel rods have smaller cross-sectional diameters, the bosses are smaller. Also, in early constructions, fewer fuel rods formed a fuel bundle than in recent constructions.

Even with all of these changes in grid and bundle construction, however, it is necessary to avoid significantly altering pressure drop. For example, a core may be composed of older (8×8) bundles and newer (11×11) bundles, and the pressure drop through each bundle preferably is uniform. One challenge with new fuel bundle constructions, and particularly, lower tie plate grid constructions, is to accommodate more fuel rods and perform debris catching functions yet maintain a pressure drop equivalent to the pressure drop resulting from older bundle constructions.

Typically, debris within boiling water nuclear reactors can include extraneous materials left over from reactor construction, debris liberated from corrosion during the reactor lifetime, and during the numerous outages and repairs, further debris accumulates. Because nuclear reactors constitute closed circulation systems, it will be appreciated that debris will essentially accumulate with increasing age and use of the reactor. A particularly vexing and usual place for the accumulation of debris is in the fuel bundles between the fuel rods, particularly in the vicinity of the fuel rod spacers. It will be recalled that each fuel rod is surrounded by a spacer at the particular elevation of the spacer. Debris particles tend to lodge between the spacer structure and the fuel rods and often dynamically vibrate with the coolant/moderator flow in abrading contact to the sealed cladding of the fuel rods.

SUMMARY OF THE INVENTION

The present invention provides a lower tie plate assembly for supporting the lower ends of fuel rods and includes a grid having a debris catcher. The grid includes a plurality of laterally spaced, generally vertically extending cylindrical bosses having through cylindrical openings which extend between upper and lower surfaces of the lower tie plate grid and receive lower ends of the fuel rods. Webs also extend between those surfaces and interconnect the bosses. The bosses and webs define a plurality of flow channels through the grid. More particularly, the bosses are arranged on vertical centerlines arranged at the corners of square matrices, and the webs extend linearly between the bosses along the sides of the square matrices. Convex portions of the cylindrical bosses thus extend between the right angularly related webs of each matrix. Accordingly, the webs and the convex portions of the bosses define coolant flow channels through the grid.

In accordance with the present invention, a debris catcher is disposed in each of the flow channels. Particularly, the debris catcher includes a plurality of members, each of which spans across and extends the full lateral extent of a flow channel between the side walls of the bosses and webs defining that flow channel. In this form of the invention, each member may comprise a shaped body, e.g., a cylinder, having wall portions within the flow channels spaced from the side walls of the bosses and webs to define a debris retention area or zone in the flow channel. The shaped member may be a round or a square cylinder, a pyramid or may be cone-shaped, i.e., a surface of revolution about an axis generally parallel to the flow direction through the grid. The upper end of the member may have a laterally projecting flange connecting the member to the webs and bosses adjacent the upper surface of the grid. The members are closed at their lower ends and may extend short of, through or beyond the lower surface of the grid. Where conically or pyramidally shaped members are employed, the lower ends may be truncated. A plurality of flow openings are formed through each member for flowing coolant therethrough. Particularly, the side walls and the bottom walls and flanges, where applicable, are provided with the flow openings. The member thus enables separation of debris from the coolant as the coolant passes through the flow openings in each member. At least part of the debris may pass into the retention area between the member and the side walls of the bosses and webs for retention.

Because of the larger surface area of the members, as compared with the cross-sectional area of each flow channel, a very substantial number of flow openings may be provided in the shaped body member, thereby minimizing the pressure drop across the grid. The members may be fabricated as part of the lower tie plate casting or may be separately cast and secured to the grid, for example, by welding. Alternatively, the members may form part of a horizontal plate joined to and overlying the downstream side of the lower tie plate grid. As stated previously, the shaped body members may comprise downwardly projecting cones or pyramids disposed in the flow channels which define debris retention zones between the outer surfaces of the members and the side walls of the bosses and webs forming the flow channel.

In a further form of the present invention, first and second sets, each of a plurality of generally parallel, laterally extending and spaced bars are disposed in the flow channels. Particularly, a first set of generally parallel, laterally spaced flow bars may be disposed adjacent the lower surface of the grid, enabling coolant to flow upwardly between the bars. A second set of generally parallel, laterally extending and spaced bars are disposed in the flow channel at a second elevation spaced from and above the first elevation and similarly enable coolant to flow upwardly between the bars. The first and second sets of bars are orthogonally related to one another, i.e., they extend at right angles to one another. The flow area at each elevation of the bars is thus greater than the flow area seen through the orthogonally related sets of bars. In a preferred form, the bars are tapered in an upward direction to form diffusers, thereby affording minimum pressure loss as the flow expands into the flow channels. Also, the lower edges of the bars are radiussed to provide smooth flow transition into the area between the bars.

In a preferred embodiment according to the present invention, there is provided a lower tie plate grid for a nuclear fuel assembly comprising a plurality of laterally spaced, generally cylindrical bosses defining openings sized for receiving lower ends of fuel rods, and webs interconnecting the bosses to define with the bosses a plurality of flow channels through the grid, the bosses and webs forming at least in part a support structure for supporting fuel rods above the grid. A plurality of members are carried by the grid and are disposed in the respective flow channels. Each member spans and extends the full lateral extent of the flow channel between side walls of the bosses and the webs and has wall portions within the flow channel spaced from the side walls defining a debris retention area between the wall portions and the side walls and has a plurality of flow openings for flowing coolant therethrough, enabling separation of debris from the coolant flowing through the grid and deposit of debris in the debris retention area.

In a further preferred embodiment according to the present invention, there is provided in a nuclear fuel assembly, a lower tie plate grid comprising a plurality of laterally spaced, generally cylindrical bosses defining openings sized for receiving lower ends of fuel rods and webs interconnecting the bosses to define with the bosses a plurality of flow channels through the grid, the bosses and the webs forming at least in part a support structure for supporting fuel rods above the grid. A first set of laterally spaced, generally parallel bars extends across each flow channel at a first elevation within the flow channel, and a second set of laterally spaced, generally parallel bars extend across each flow channel at a second elevation spaced from the first elevation, the first and second sets of bars extending substantially orthogonally relative to one another.

Accordingly, it is a primary object of the present invention to provide a novel and improved lower tie plate grid for supporting a nuclear fuel bundle having a debris catcher for limiting the passage of debris in the coolant flow through the tie plate grid with minimal pressure drop.

BRIEF DESCRIPTION OF THE DRAWINGS

FIG. 4 is an enlarged fragmentary plan view of a lower tie plate grid illustrating a debris catcher in place in a flow channel in accordance with the present invention;

FIG. 5 is a cross-sectional view thereof taken generally about on line 5—5 in FIG. 4;

FIG. 6 is a view similar to FIG. 4 illustrating a further form of a tie plate grid with a debris catcher according to the present invention;

FIG. 7 is a cross-sectional view thereof taken generally about on line 7—7 in FIG. 6;

FIG. 8 is a view similar to FIG. 4 illustrating a still further form of a tie plate grid with a debris catcher according to the present invention;

FIG. 9 is a cross-sectional view thereof taken generally about on line 9—9 in FIG. 8;

FIGS. 12 and 13 are cross-sectional views thereof taken generally about on lines 12—12 and 13—13 in FIG. 11; and FIG. 14 is a plan view illustrating the flow channel of FIG. 11 with bars in place.

BEST MODE FOR CARRYING OUT THE INVENTION

Figure 1:
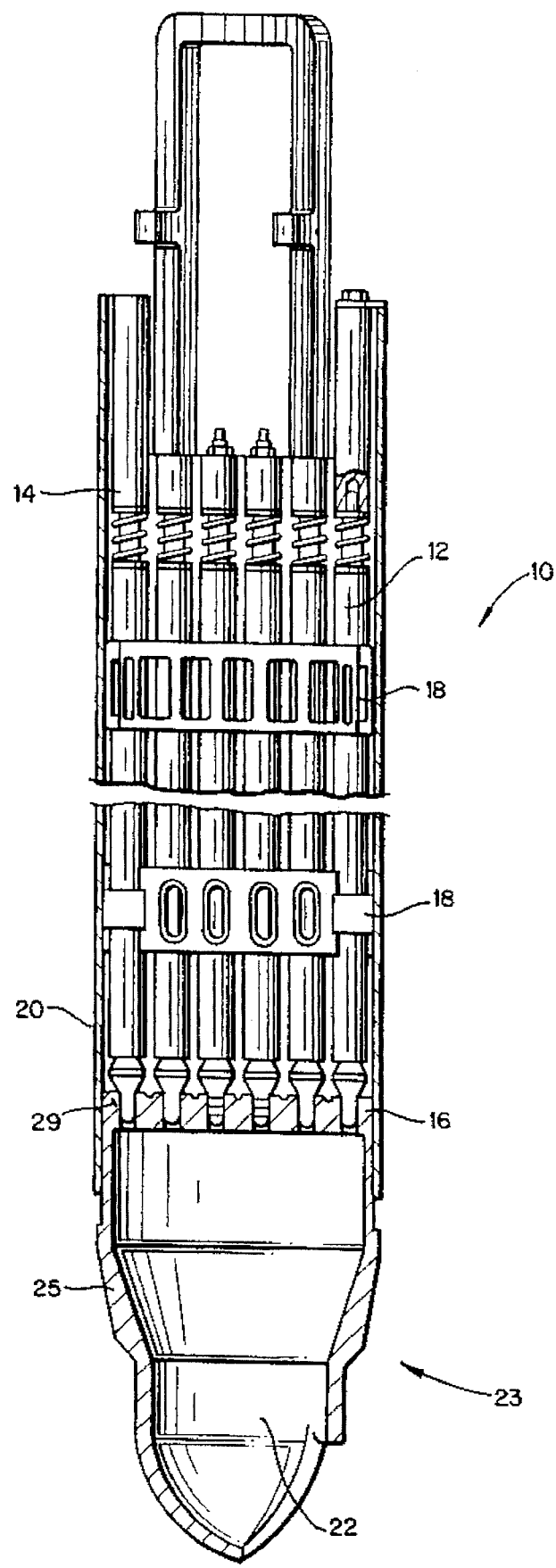
FIG. 1 is a vertical cross-sectional view of a conventional fuel assembly illustrating a fuel bundle supported on a lower tie plate assembly.

Referring now to the representative example of a fuel assembly, generally designated 10 in FIG. 1, there is illustrated a plurality of nuclear fuel rods 12 forming a nuclear fuel bundle. The rods 12 are connected at their upper ends to an upper tie plate 14 and are supported at their lower ends in a lower tie plate grid 16, forming part of a tie plate assembly, generally designated 23. Spacers 18 are arranged at a plurality of vertically spaced locations to maintain lateral spacing of the fuel rods 12 relative to one another. The fuel bundle is disposed within a fuel bundle channel 20 whereby coolant water inlet through the bottom nozzle or inlet opening 22 of the tie plate assembly 23 flows upwardly therefrom through a transition structure 25 defining an enlarged flow volume 27 for flow through the lower tie plate grid 16 thereof and about the fuel rods whereby steam is generated.

Figure 2:
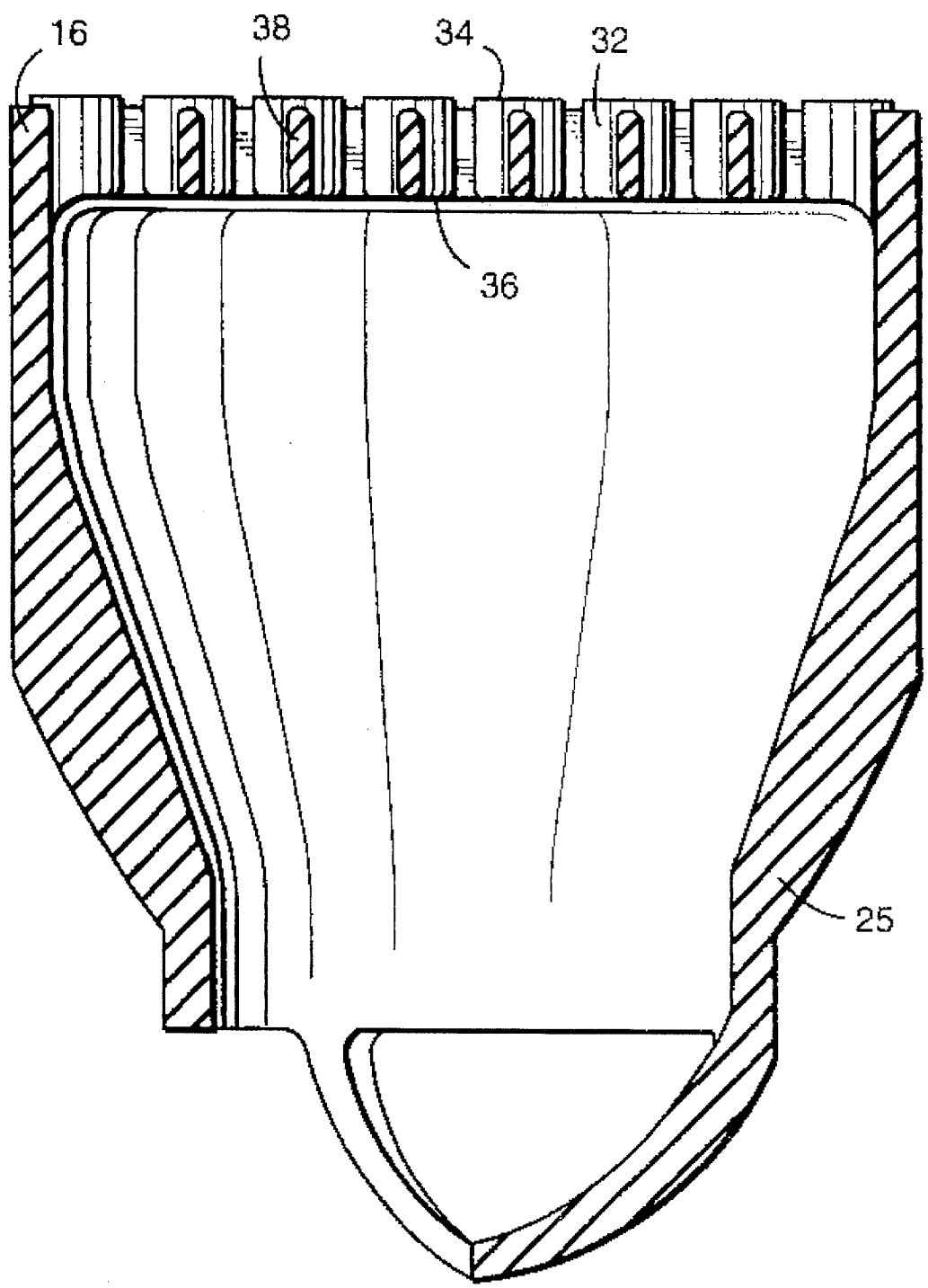
FIG. 2 is an enlarged cross-sectional view of a lower tie plate assembly of the prior art and taken generally about on line 2—2 in FIG. 3.
Figure 3:
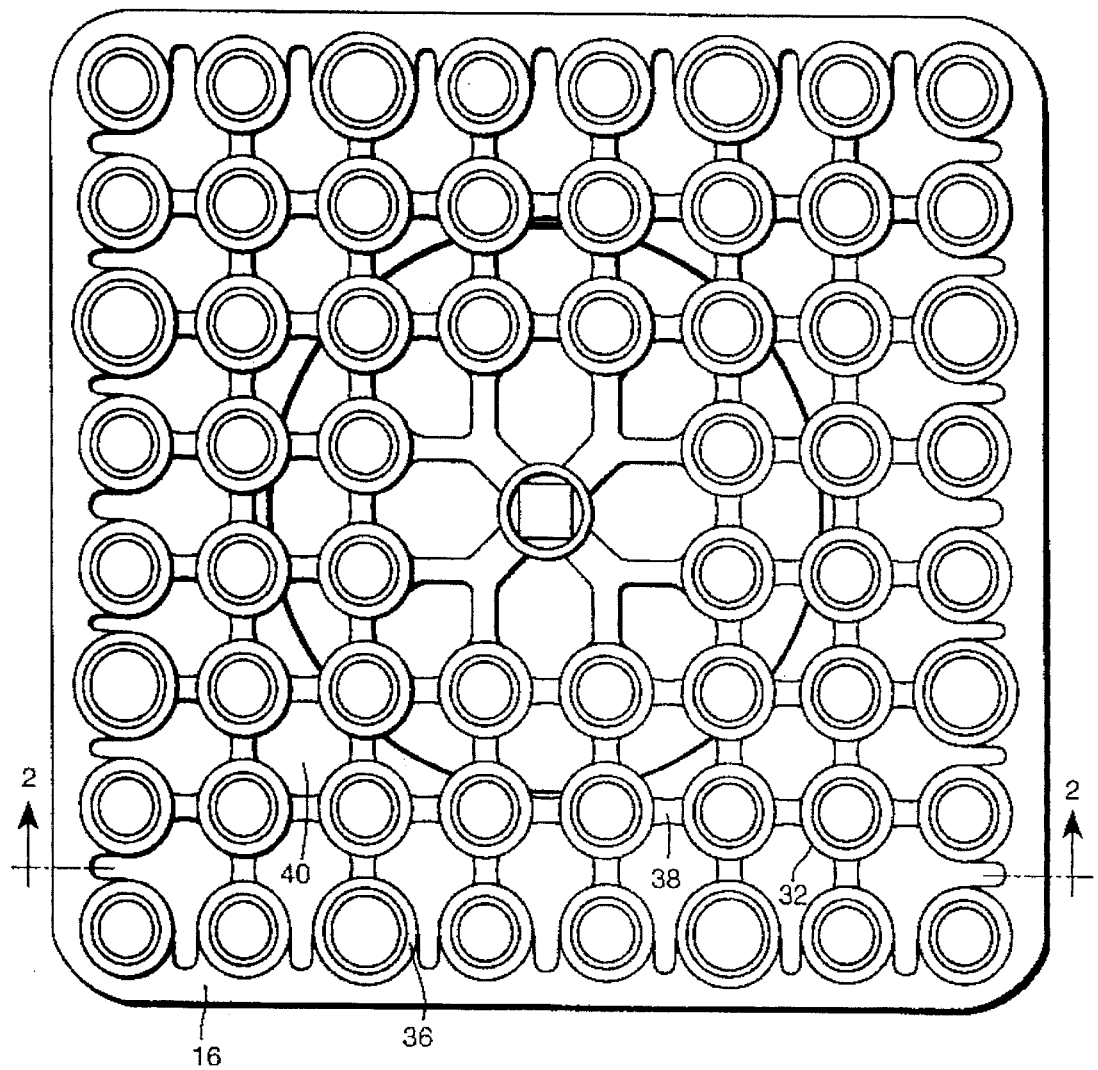
FIG. 3 is a top plan view of a conventional lower tie plate grid.

In FIGS. 2 and 3, the lower tie plate assembly 23 is illustrated in greater detail. Particularly, the lower tie plate assembly grid 16 includes cylindrical bosses 32 which extend between the upper and lower surfaces 34 and 36 of the tie plate grid 16 for receiving the cylindrical end plugs of the nuclear fuel rods and supporting the latter. As illustrated in FIG. 3, the cylindrical bosses 32 have centerlines arranged at corners of substantially square matrices thereof. Interconnecting and forming the sides of the square matrices are webs 38 joining the adjacent cylindrical bosses 32 along radial lines of bosses 32. The webs and bosses extend between the upper and lower surfaces of the lower tie plate grid 16. Consequently, it will be seen that the webs 38 have portions formed along the sides of each square matrix and, together with convex outer portions of the cylindrical bosses 32, define coolant flow channels 40. Flow channels 40 extend between the upper and lower surfaces of the grid for flowing coolant from the flow volume 27 through the grid 16 and upwardly about the fuel rods supported by the lower tie plate assembly 23.

Referring now to FIGS. 4 and 5, the debris catching function of the lower tie plate grid of the present invention is performed by shaped body members 42 disposed in the flow channels 40. In a first form of the present invention, the shaped body member 42 comprises a square cylinder having discrete side walls 44 and which square cylinder is closed at its bottom by a wall 46. The upper end of the square cylinder 42 has a laterally projecting flange 48 for engaging the side wall portions of the webs and bosses. As illustrated in the drawings, the member 42 spans and extends the full lateral extent of the flow channel 40 between the side walls of the bosses and webs. The discrete side walls 44 define with the side walls of the bosses and webs a debris retention zone or area 50.

The shaped body member 42 has a plurality of openings 52 formed in its side wall 44 and bottom wall 46, enabling passage of the coolant in an upward direction through the flow channel 40. That is, the side walls 44 and bottom wall 46 have openings which enable the coolant to flow through the openings 52 and into the confines of the member and upwardly into the flow area between the fuel rods. By shaping the member 42 to provide a large surface area in the confined space of the flow channel 40, the aggregated area of the flow openings through the member may approximate the area of the flow channels and hence enable minimum pressure drop across the grid while simultaneously performing a debris catching function. Thus, debris of a size greater than the flow openings 52 is blocked from passing through the grid 16 by the shaped member as the coolant flows through the openings. Debris may be collected in the debris retention zone 50 between the member 42 and the side walls of the bosses and webs.

Figure 5A:
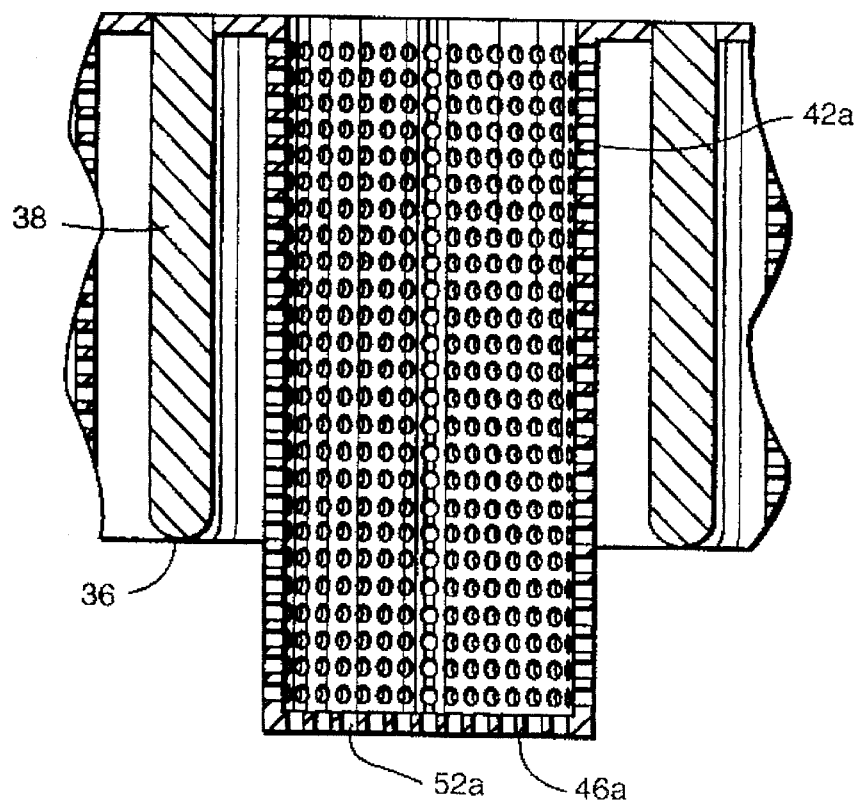
FIG. 5A is a view similar to FIG. 5 illustrating the debris catching member extending below the lower surface of the tie plate.

It will be appreciated that the member may extend below the lower surface of the grid into the flow volume below the grid. Thus, in FIG. 5A, a similar square cylinder 42a as in FIG. 5 is illustrated. Here, the member 42a extends below the lower surface 36 of the grid terminating in an end wall 46a having flow openings 52a therethrough.

Referring now to FIGS. 6 and 7, there is shown a further form of a shaped member 42b of the present invention. In this form, member 42b may be pyramidal in shape with discrete sides 54. Again, the walls 54 of the pyramidal-shaped member 42b have a plurality of openings 52b for enabling coolant to flow through the member and into the confines of the member 42b for flow into the region about the nuclear fuel rods. As in the prior embodiment, a debris retention zone or area 50b is located between the side walls of the bosses 32b and webs 38b and the wall portions defining the pyramidal-shaped member 42b. Note that member 42b extends below the lower surface of the grid.

Referring now to FIGS. 8 and 9, there is shown a further form of a shaped member 42c of the present invention. In this form, member 42c may be conical in shape, constituting a surface of revolution about an axis A—A substantially parallel to the upward direction of coolant flow through the grid 16c. The walls of the conically-shaped member 42c have a plurality of openings 52c for enabling coolant to flow through the member 42c and into the confines of the member 42c for flow into the region about the nuclear fuel rods. As in previous embodiments, a debris retention zone 50c is located between the side walls of the bosses 32c and webs 38c and the wall portions defining the conical member 42c. Also, as in the previous embodiment, the apex of the conically-shaped member 42c extends below the lower surface of grid 16c.

Figure 10:
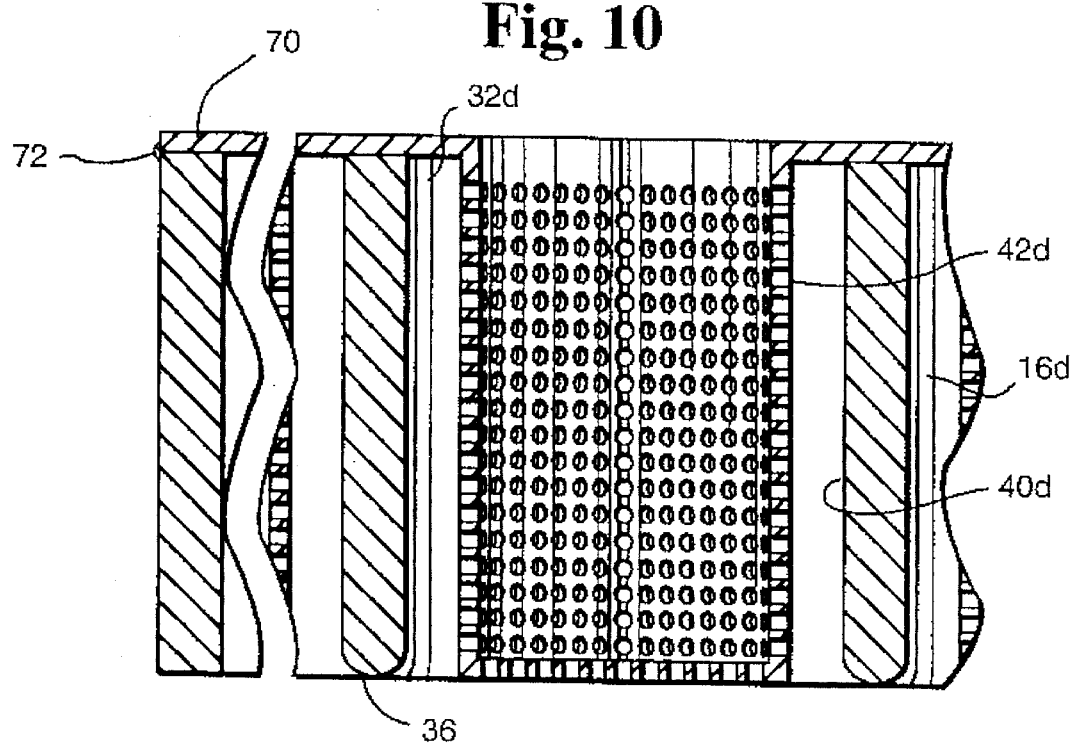
FIG. 10 is a cross-sectional view of a further form of the present invention.

In the preceding embodiments of the present invention, namely in FIGS. 4–9, the members 42 are suitably secured in the flow shape channels, for example, preferably by welding the individual members in the channel along their upper margins. In an alternate form of the present invention, the members may be formed integrally with a separate plate which overlies the upper surface of the grid 16. Referring to FIG. 10, the plate 70 has suitable openings corresponding to and in registration with the openings through the bosses for receiving the fuel rod end plugs when the plate is positioned on the grid. The members 42d depend to or project from one side of plate 70 and, upon placement and securement of the plate on the upper surface of the grid, extend into the flow channels 40d. The plate 70 may be secured to the grid by welding about the outer perimeter of the plate and grid, as illustrated at 72 in FIG. 10.

More particularly, and referring now to the embodiment hereof illustrated in FIG. 10, the members 42d may be integrally cast with the grid 16d or may be integrally cast with an overlying plate 70. In this form, the overlying plate 70 has a plurality of openings corresponding in size for registration with the openings through the bosses 32d such that the end plugs of the fuel rods may be received through the openings of the plate and the openings of the bosses 32d. Additionally, the shaped members 42d may be located to depend from the plate 70 such that, upon superposition of plate 70 over grid 16d, the members 42d will project into the flow channel openings 40d. As in the previous embodiments, when the plate 70 overlies the grid 16d, the members 42d may project into the flow openings short of, flush with or below the lower surface of grid 16d. It will also be appreciated that the shape of the members 42d may be any one of the shapes previously described and illustrated, i.e., round or square cylindrical, pyramidal or conical, or truncated pyramidal or conical. Also as in the previous embodiments, the members 42d have a plurality of openings 52d for flowing coolant through the members and the corresponding opening in the plate 70 for flow about the fuel rods.

Figure 11:
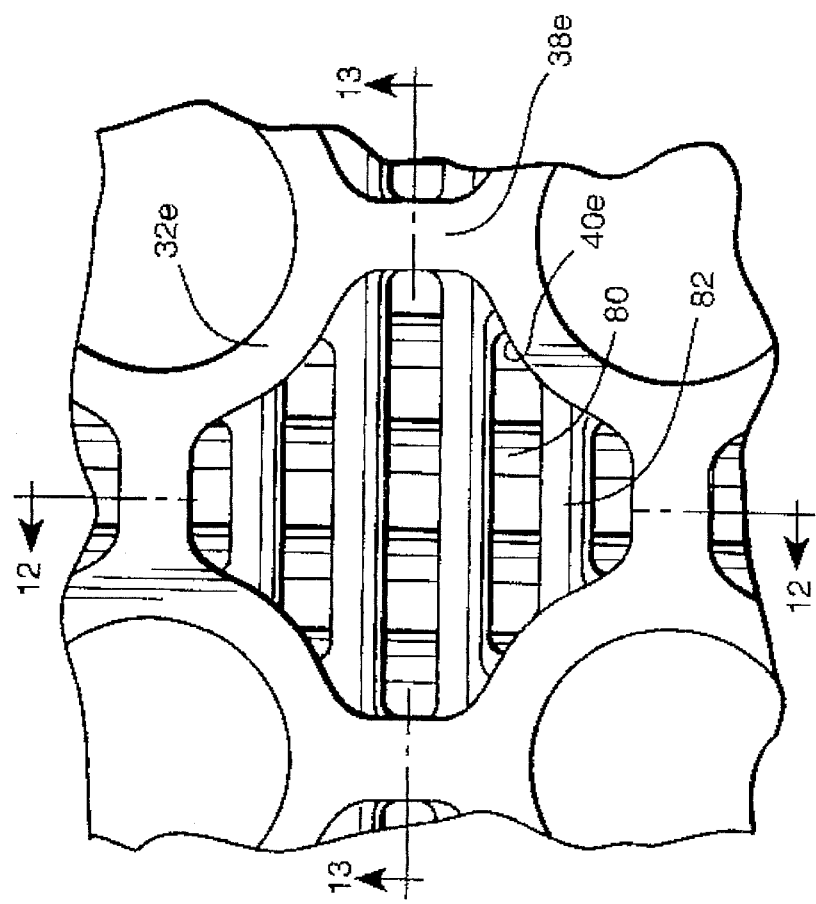
FIG. 11 is a view similar to FIG. 4 illustrating a still further form of the present invention.

Referring now to the embodiment hereof illustrated in FIGS. 11–14, the flow channel 40e is formed similarly as previously described by the side walls of bosses 32e and webs 38e. In the flow channel 40e, however, and in accordance with this form of the invention, there are provided two sets of a plurality of bars each at different elevations in each of the flow channels of the grid. Particularly, a first set of generally parallel, laterally spaced bars 80 extend between generally opposed convex portions of the bosses 32e and the opposed webs 38e at a first elevation adjacent the lower surface of the grid 16c. A second set of a plurality of generally parallel, laterally spaced bars 82 extend between opposed convex portions and webs at an elevation spaced above the first elevation of the first set of bars 80. Additionally, the bars 80 and 82 of the first and second sets of bars, respectively, are orthogonally located relative to one another, as illustrated in FIGS. 11 and 14. Consequently, a crisscross pattern of bars in plan view as illustrated in FIG. 14 is provided. Because the bars are elevationally spaced one from the other, the flow area through the flow channel is decreased effectively only by the thickness of one set of bars, while concurrently debris of a size larger than the flow openings through the orthogonally related bars 80, 82, as seen in plan, is caught by the debris catcher. With this arrangement, a minimum pressure drop occurs across the grid 16e. Preferably, the first and second sets of bars 80, 82 lie closer to the lower surface of grid 16e than to the upper surface.

Figure 12:
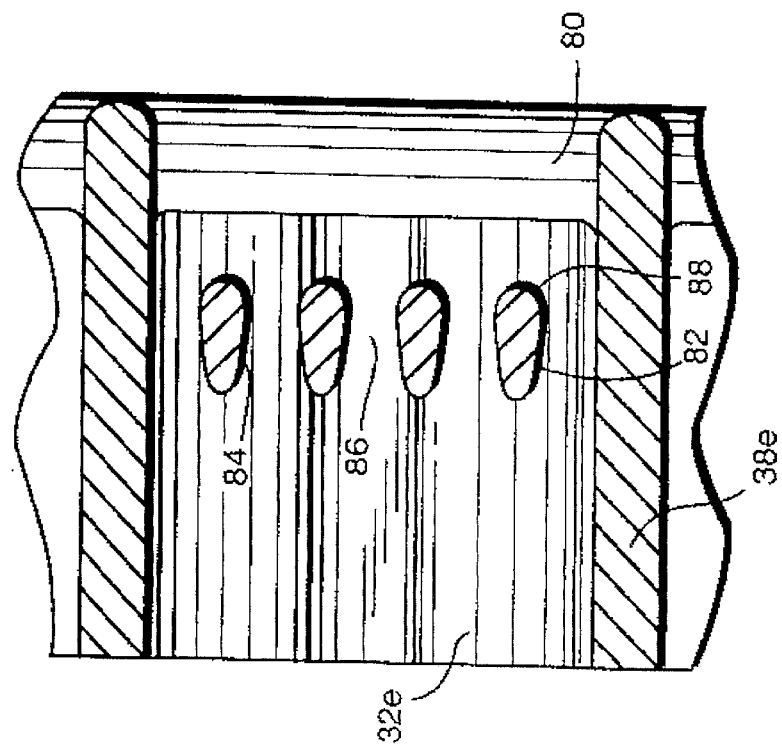

Additionally, the bars are shaped to facilitate flow through the grid 16e. As best seen in FIGS. 12 and 13, the side walls of the bars are tapered inwardly at 84 in an upward direction forming diffusers 86 with the side walls of adjacent bars. This affords smooth transition of the flow between the bars and the side wall of the bosses 32e and webs 38e into the flow channel. Additionally, the lower edges of each of the bars are radiussed at 88 likewise to provide a smooth transition of flow through the grid 16e.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a nuclear fuel assembly, a lower tie plate grid comprising:

a plurality of laterally spaced, generally cylindrical bosses defining openings sized for receiving lower ends of fuel rods and webs interconnecting said bosses to define with said bosses a plurality of flow channels extending generally vertically through said grid, said bosses and said webs forming at least in part a support structure for supporting fuel rods above said grid and having upper and lower surfaces lying in vertically spaced planes; and a first set of laterally spaced, generally parallel bars extending across each said flow channel at a first elevation within said flow channel between said upper and lower surfaces, a second set of laterally spaced, generally parallel bars extending across each said flow channel at a second elevation within said flow channel between said upper and lower surfaces and spaced from said first elevation, said first and second sets of bars extending substantially orthogonally relative to one another, each bar of said first and second sets thereof having in cross-section a vertical extent greater than its lateral extent, the bars of said first set thereof and the bars of said second set thereof being elevationally spaced from one another thereby effectively decreasing the flow area through each flow channel by only the thickness of one set of bars for minimizing pressure drop across said grid.

2. A lower tie plate grid according to claim 1 wherein said bars of each set thereof are tapered in an upward direction to form diffusers, thereby minimizing pressure drop across the grid as the coolant flow expands in the flow channel above said bars.

3. A lower tie plate grid according to claim 2 wherein the bars have radiussed lower edges, affording a smooth flow transition into the diffuser.

4. A lower tie plate grid according to claim 2 wherein said first and second sets of bars are located closer to said lower surface than to said upper surface.

5. In a nuclear fuel assembly having a lower tie plate grid according to claim 1, a fuel rod support structure, including a lower tie plate assembly comprised of an inlet nozzle, said lower tie plate grid and a transition structure defining a flow volume for receiving coolant entering said nozzle and flowing coolant to said lower tie plate grid.

6. In a nuclear fuel assembly having a lower tie plate grid according to claim 1, including a plate overlying said grid, said members depending from said plate for disposition within said flow channels and means for securing said plate and said grid to one another.

7. In a nuclear fuel bundle and support therefor having a lower tie plate grid according to claim 1, upper and lower tie plate assemblies, a nuclear fuel bundle between said upper and lower tie plate assemblies and including a plurality of fuel rods, said lower tie plate assembly including said lower tie plate grid for supporting said nuclear fuel bundle.

8. In a nuclear fuel bundle and support therefor according to claim 7, including a plate overlying said grid, said members depending from said plate for disposition within said flow channels and means for securing said plate and said grid to one another.

* * * * *